(12) United States Patent
Li et al.

(10) Patent No.: US 10,627,543 B2
(45) Date of Patent: Apr. 21, 2020

(54) METHOD FOR PREDICTING RESERVOIR REFORM VOLUME AFTER VERTICAL WELL VOLUME FRACTURING OF LOW-PERMEABILITY OIL/GAS RESERVOIR

(71) Applicant: SOUTHWEST PETROLEUM UNIVERSITY, Chengdu (CN)

(72) Inventors: Yongming Li, Chengdu (CN); Wenjun Xu, Chengdu (CN); Jinzhou Zhao, Chengdu (CN); Youshi Jiang, Chengdu (CN); Liehui Zhang, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 79 days.

(21) Appl. No.: 16/069,173

(22) PCT Filed: Apr. 28, 2017

(86) PCT No.: PCT/CN2017/082411
§ 371 (c)(1),
(2) Date: Jul. 11, 2018

(87) PCT Pub. No.: WO2018/195909
PCT Pub. Date: Nov. 1, 2018

(65) Prior Publication Data
US 2019/0377101 A1 Dec. 12, 2019

(30) Foreign Application Priority Data
Apr. 26, 2017 (CN) .......................... 2017 1 0280797

(51) Int. Cl.
G01V 99/00 (2009.01)
E21B 43/26 (2006.01)
(Continued)

(52) U.S. Cl.
CPC ............ G01V 99/005 (2013.01); E21B 43/26 (2013.01); E21B 47/06 (2013.01); E21B 49/00 (2013.01)

(58) Field of Classification Search
None
See application file for complete search history.

(56) References Cited

U.S. PATENT DOCUMENTS

2014/0358510 A1* 12/2014 Sarkar .................... E21B 43/26
703/10
2015/0205006 A1* 7/2015 Maerten ............... G01V 99/005
703/2

FOREIGN PATENT DOCUMENTS

CN 104278980 A 1/2015
CN 105735960 A 7/2016

OTHER PUBLICATIONS

Nassir et al., "Prediction of Stimulated Reservoir Volume and Optimization of Fracturing in Tight Gas and Shale With a Fully Elasto-Plastic Coupled Geomechanical Model" SPE Journal, Oct. 2014 (Year: 2014).*

(Continued)

Primary Examiner — John C Kuan
(74) Attorney, Agent, or Firm — Bayramoglu Law Offices LLC

(57) ABSTRACT

The invention provides a method for predicting a reservoir reform volume after vertical well volume fracturing of a low-permeability oil/gas reservoir. The method sequentially includes the following steps: (1) calculating an induced stress produced by a hydraulic fracture in a three-dimensional space; (2) calculating a stratum pore pressure obtained after leak-off of fracturing fluid; (3) calculating a stratum pore elastic stress obtained after the leak-off of the fracturing fluid; (4) overlapping the stress fields obtained in the step (1), (2) and (3) with an original crustal stress field (Continued)

to obtain a new crustal stress field, and calculating the magnitude and direction of the overlapped three-direction effective principal stress in the reservoir space; (5) calculating an open fracturing determination coefficient M of a natural fracture in the reservoir space and a shear fracturing area determination coefficient S of the natural fracture.

6 Claims, 4 Drawing Sheets

(51) Int. Cl.
*E21B 47/06* (2012.01)
*E21B 49/00* (2006.01)

(56) References Cited

OTHER PUBLICATIONS

Warpinski N R et al., Analysis and Prediction of Microseismicity Induced by Hydraulic Fracturing, SPE Journal, Mar. 2004, 24-33.
Kan Wu, Numerical Modeling of Complex Hydraulic Fracture Development in Unconventional Reservoirs, Dec. 31, 2014, 89-102.
Smith M B, Stimulation design for short, precise hydraulic fractures, Society of Petroleum Engineers Journal, 1985, 371-379.
Dingwei Weng et al., A Model for Predicting the Volume of Stimulated Reservoirs, Petroleum drilling techniques, Jan. 2016, vol. 44 No. 1.

* cited by examiner

METHOD FOR PREDICTING RESERVOIR REFORM VOLUME AFTER VERTICAL WELL VOLUME FRACTURING OF LOW-PERMEABILITY OIL/GAS RESERVOIR

CROSS REFERENCE TO RELATED APPLICATIONS

This application is the national phase entry of International Application PCT/CN2017/082411, filed on Apr. 28, 2017, which is based upon and claims priority to Chinese Patent Application No. 201710280797.9, filed on Apr. 26, 2017, the entire contents of which are incorporated herein by reference.

TECHNICAL FIELD

The present invention belongs to the field of oil-gas field development, and in particular, to a method for predicting a reservoir reform volume after vertical well volume fracturing of a low-permeability oil/gas reservoir.

BACKGROUND

The low-permeability reservoir has poor physical properties, complex pore structure, low surface porosity and small throat, and therefore, an expected yield-increasing effect is hardly achieved by a conventional fracturing technology. The volume fracturing technology is an important technological measure to reform a low-permeability oil/gas field and increase the yield. Horizontal well volume fracturing is the main technical means for yield increase and reformation a low-permeability oil/gas reservoir. However, low-permeability oil/gas reservoirs in China are dominated by continental deposits, and low-permeability reservoirs developed in some oilfield blocks (such as some blocks in the Changqing Oilfield and Jilin Oilfield) are characterized by small reservoir forming areas, more longitudinal sublayers and small thickness. Therefore, the horizontal well volume reform technology shows some inadaptability, making the vertical well volume fracturing technology applied to the development of such reservoirs on a large scale. Accurate interpretation results of fractured reservoir reform volume are conducive to reasonably evaluating the vertical well volume fracturing effect, optimizing the fracturing construction design and accurately predicting the yield after fracturing. At present, the commonly used methods for on-site monitoring of a volume fractured fracture at home and abroad include micro-seismic monitoring, inclinometer monitoring, and distributed acoustic sensing fracture monitoring. The micro-seismic monitoring which is a widely used fracture monitoring method can be used to detect the orientation, fracture length, fracture width, fracture height and inclination angle of a complex fracture network body. However, this method has high technical cost and is not suitable for large-scale multi-well applications. If a reservoir reform volume mathematical model is used to predict the reservoir reform volume after volume fracturing, the cost can be greatly reduced. The existing reservoir reform volume prediction methods mainly include a semi-analysis method, a yield fitting method and a discrete fracture network simulation method. The semi-analysis method and the yield fitting method have higher requirements for basic data, so the former needs micro-seismic monitoring data of part of wells in the target block for performing calibration to obtain reliable prediction results, while the latter is necessary to predict the magnitude of the reservoir reform volume based on yield data after fracturing. Although a discrete fracture network simulation method does not need to obtain the micro-seismic monitoring data and the yield data after fracturing in advance, but is relatively complex in basic theories, large in calculation amount, poor in model convergence and not easy to implement. Therefore, it can be seen that the existing method for predicting the reservoir reform volume has certain deficiencies and is thus not suitable for large-scale application field practice.

To sum up, the currently required method for predicting a reservoir reform volume after vertical well volume fracturing of a low-permeability oil/gas reservoir should have the following two characteristics: (1) the requirements for basic data are relatively low during implementation, and the reservoir reform volume after volume fracturing can be directly predicted without the need to obtain a large amount of basic data such as micro-seismic monitoring data and yield data after fracturing in advance; (2) the basic theory is perfect, the idea is concise and intuitive, the operability is high, and accurate prediction results can be obtained.

SUMMARY

An objective of the present invention is to provide a method for predicting a reservoir reform volume after vertical well volume fracturing of a low-permeability oil/gas reservoir. The method of the present invention which is used for predicting the reservoir reform volume after vertical well volume fracturing is better in operability and accuracy, provides a favorable theoretical basis for effect evaluation and yield prediction after vertical well volume fracturing of the low-permeability oil/gas reservoir, and overcomes the defects of the prior art.

To fulfill said technical objective, the present invention provides the following technical solution.

First, a crustal stress field calculation model under a three-dimensional hydraulic fracture interference mode is established, i.e., calculating an induced stress produced by a hydraulic fracture at any point in a three-dimensional space, a stratum pore pressure obtained after leak-off of fracturing fluid and a pore elastic stress respectively, and overlapping the three stress fields with an original crustal stress field based on the basic theory of elastic mechanics to obtain a crustal stress field under the three-dimensional hydraulic fracture interference mode; secondly, the magnitude and direction of three-direction effective principal stress under the three-dimensional hydraulic fracture interference mode are calculated; at last, under a complex crustal stress field with three-dimensional hydraulic fracture interference, whether a natural fracture in the reservoir space is opened or fractured by shearing is calculated and analyzed, and the total swept volume of the two fracture ways is equivalent to the reservoir reform volume.

A method for predicting a reservoir reform volume after vertical well volume fracturing of a low-permeability oil/gas reservoir sequentially comprises the following steps:

(1) calculating an induced stress produced by a hydraulic fracture in a three-dimensional space. Based on the three-dimensional displacement discontinuity theory, a three-dimensional hydraulic fracture induced stress field calculation model is established (Wu K. Numerical modeling of complex hydraulic fracture development in unconventional reservoirs [D]. The University of Texas at Austin, 2014). The magnitude of an induced stress produced by a hydraulic fracture at any point i in a three-dimensional space is calculated according to the following calculation formula:

$$\begin{cases} \sigma_{xx}^i = \sum_{j=1}^{N} F_{xx,sL}^{i,j} D_{sL}^j + \sum_{j=1}^{N} F_{xx,sH}^{i,j} D_{sH}^j + \sum_{j=1}^{N} F_{xx,nn}^{i,j} D_n^j \\ \sigma_{yy}^i = \sum_{j=1}^{N} F_{yy,sL}^{i,j} D_{sL}^j + \sum_{j=1}^{N} F_{yy,sH}^{i,j} D_{sH}^j + \sum_{j=1}^{N} F_{yy,nn}^{i,j} D_n^j \\ \sigma_{zz}^i = \sum_{j=1}^{N} F_{zz,sL}^{i,j} D_{sL}^j + \sum_{j=1}^{N} F_{zz,sH}^{i,j} D_{sH}^j + \sum_{j=1}^{N} F_{zz,nn}^{i,j} D_n^j \\ \sigma_{xy}^i = \sum_{j=1}^{N} F_{xy,sL}^{i,j} D_{sL}^j + \sum_{j=1}^{N} F_{xy,sH}^{i,j} D_{sH}^j + \sum_{j=1}^{N} F_{xy,nn}^{i,j} D_n^j \\ \sigma_{xz}^i = \sum_{j=1}^{N} F_{xz,sL}^{i,j} D_{sL}^j + \sum_{j=1}^{N} F_{xz,sH}^{i,j} D_{sH}^j + \sum_{j=1}^{N} F_{xz,nn}^{i,j} D_n^j \\ \sigma_{yz}^i = \sum_{j=1}^{N} F_{yz,sL}^{i,j} D_{sL}^j + \sum_{j=1}^{N} F_{yz,sH}^{i,j} D_{sH}^j + \sum_{j=1}^{N} F_{yz,nn}^{i,j} D_n^j \end{cases} \quad (1)$$

$$\begin{cases} \sigma_{zz}^j = p_{net}^j \\ \sigma_{xz}^j = 0 \quad (j = 1, 2, 3, \ldots, N) \\ \sigma_{yz}^j = 0 \end{cases} \quad (2)$$

in the formulas:

$\sigma_{xx}^i, \sigma_{yy}^i, \sigma_{zz}^i, \sigma_{xy}^i, \sigma_{xz}^i, \sigma_{yz}^i$ are positive induced stresses and shear induced stresses produced by the hydraulic fracture at any point i in the three-dimensional space respectively, MPa;

$F_{xx,sL}^{i,j}, F_{xx,sH}^{i,j}, F_{xx,nn}^{i,j}, F_{yy,sL}^{i,j}, F_{yy,sH}^{i,j}, F_{yy,nn}^{i,j}, F_{zz,sL}^{i,j}, F_{zz,sH}^{i,j}, F_{zz,nn}^{i,j}, F_{xy,sL}^{i,j}, F_{xy,sH}^{i,j}, F_{xy,nn}^{i,j}, F_{xz,sL}^{i,j}, F_{xz,sH}^{i,j}, F_{xz,nn}^{i,j}, F_{yz,sL}^{i,j}, F_{yz,sH}^{i,j}$ and $F_{yz,nn}^{i,j}$ are boundary influence coefficients respectively;

N is a total number of units divided by the hydraulic fracture;

$D_{sL}^j$, $D_{sH}^j$ and $D_n^j$ are discontinuity quantities of tangential and normal displacements on the hydraulic fracture unit j respectively, which can be reversely derived from a condition given in (2) in combination with a formula (1);

$\sigma_{zz}^i$ is a positive stress boundary value in the original minimum crustal stress direction (parallel to z-axis) on the hydraulic fracture unit j, which is generally a net pressure suffered by the hydraulic fracture wall, MPa;

$\sigma_{xz}^i$ and $\sigma_{yz}^i$ are boundary values of shear stresses on the hydraulic fracture unit j respectively, generally 0, MPa;

$p_{net}^j$ is a net pressure on the hydraulic fracture unit j, MPa.

(3) Calculating a stratum pore pressure obtained after leak-off of fracturing fluid. The permeability of a low-permeability reservoir matrix is extremely low, so the leak-off of fracturing fluid to the matrix can be ignored. Under normal circumstances, the natural fractures developed in the reservoir serve as main channels for leak-off of fracturing fluid. In the low-permeability reservoir, only the leak-off behavior of the fracturing fluid along the natural fractures is considered. Due to the differences in the original fluid properties of the stratum and the structural characteristics of the reservoir rock, different methods are used in a low-permeability oil reservoir and a low-permeability gas reservoir to calculate the stratum pore pressure change values caused by leak-off of fracturing fluid. The specific calculation formulas (Warpinski N R, Wolhart S L, Wright C A. Analysis and Prediction of Microseismicity Induced by Hydraulic Fracturing [J]. SPE Journal, 2004, 9(01): 24-33) are as follows:

for the low-permeability oil reservoir:

$$\begin{cases} P^i = P_0 + (P_f - P_0) e^{-\xi\lambda\left(1+\sqrt{\mu+b^2}\right)} \\ \xi = \left(\frac{g\pi}{2}\right)^2 \\ g = \sqrt{\dfrac{\phi\mu_l c}{kt}} \end{cases} \quad (3)$$

for the low-permeability gas reservoir:

$$\begin{cases} P^i = P_o + (P_f - P_o)\dfrac{\eta}{\eta_L} \\ \eta_L = \sqrt{\dfrac{2k(P_f - P_o)t}{\mu_l \phi L^2}} \\ \eta = \operatorname{arsinh}\left(\sqrt{\dfrac{x_i^2 + y_i^2 - L^2 + \sqrt{(L^2 - x_i^2 - y_i^2)^2 + 4L^2 y_i^2}}{2L^2}}\right) \end{cases} \quad (4)$$

in the formulas:

$P^i$ is a pore pressure at any point i in the stratum after leak-off of fracturing fluid, MPa;

$P_o$ is an original pore pressure of the stratum, MPa;

$P_f$ is a fluid pressure in the hydraulic fracture, MPa;

$\lambda$, $\mu$ is a coordinate value of any leak-off point i in a three-dimensional hydraulic fracture ellipsoidal coordinate system, m$^2$;

b is a half fracture height of the hydraulic fracture at a wellbore, m;

$\varphi$ is porosity of the natural fracture, no dimension;

$\mu_l$ is the viscosity of fracturing fluid, mPa·s;

c is a compression factor of the natural fracture, MPa$^{-1}$;

k is permeability of the reservoir, D;

t is leak-off time, s;

L is a length of the hydraulic fracture, m;

$x_i$ is a coordinate value of any leak-off point i in a three-dimensional rectangular coordinate system along the fracture length (x-axis direction), m;

$y_i$ is a coordinate value of any leak-off point i in the three-dimensional rectangular coordinate system along the fracture height direction (y-axis direction), m.

(3) calculating a stratum pore elastic stress obtained after leak-off of fracturing fluid. The leak-off of fracturing fluid will increase the pore pressure in the local reservoir, and will disturb the stress around the hydraulic fracture. In the low-permeability gas reservoir, the influence of the pore elastic stress can be neglected, but in the oil reservoir, this pore elastic stress cannot be neglected, and can be calculated according to the formula (Smith M B. Stimulation design for short, precision hydraulic fractures [J]. Society of Petroleum Engineers Journal, 1985, 25(03):371-379):

$$\begin{cases} \Delta\sigma^i = \dfrac{A(P^i - P_o)}{2 + \varsigma} \\ A = \alpha\dfrac{1 - 2\nu}{1 - \nu} \\ \varsigma = \dfrac{\gamma h\sqrt{\pi} + \sqrt{\gamma^2 h^2 \pi + 4}}{2} \\ \gamma = \sqrt{\dfrac{10^3 \times \phi\mu c}{4kt}} \end{cases} \quad (5)$$

in the formula:

$\Delta\sigma^i$ is a pore elastic stress produced by a change in the stratum pore pressure at any point i, MPa;

A is a pore elastic constant, no dimension;

v is a Poisson's ratio of stratum rock, no dimension;

$\zeta$ is a parameter for describing the dimension and shape of fluid intrusion, no dimension;

α is a Biot coefficient, no dimension;

h is a half fracture height of the natural fracture, m.

(4) Overlapping the above three stress fields with an original crustal stress field to obtain a new crustal stress field, and calculating the magnitude and direction of the overlapped three-direction effective principal stress in the reservoir space. First, the three induced stress fields are overlapped with the original crustal stress field based on the basic theory of elastic mechanics, and the calculation formula is as follows:

$$\begin{cases} \sigma_{xxT} = \sigma_{xx} + \sigma_H + \alpha P + \Delta\sigma \\ \sigma_{yyT} = \sigma_{yy} + \sigma_V + \alpha P + \Delta\sigma \\ \sigma_{zzT} = \sigma_{zz} + \sigma_h + \alpha P + \Delta\sigma \\ \sigma_{xyT} = \sigma_{xy} \\ \sigma_{xzT} = \sigma_{xz} \\ \sigma_{yzT} = \sigma_{yz} \end{cases} \quad (6)$$

Secondly, equation (6) is substituted into equation (7) and equation (7) is solved to obtain the magnitude of the three-direction effective principal stress in the reservoir space after the stress fields are overlapped.

$$\sigma_i^3 - (\sigma_{xxT} + \sigma_{yyT} + \sigma_{zzT})\sigma_i^2 + (\sigma_{xxT}\sigma_{yyT} + \sigma_{xxT}\sigma_{zzT} + \sigma_{yyT}\sigma_{zzT} - \sigma_{xyT}^2 - \sigma_{xzT}^2 - \sigma_{yzT}^2)\sigma_i - (\sigma_{xxT}\sigma_{yyT}\sigma_{zzT} - \sigma_{xxT}\sigma_{yzT}^2 - \sigma_{yyT}\sigma_{xzT}^2 - \sigma_{zzT}\sigma_{xyT}^2 + 2\sigma_{xyT}\sigma_{xzT}\sigma_{yzT}) = 0 (i=1,2,3) \quad (7)$$

Then, the direction of the three-direction effective principal stress in the reservoir space after the stress fields are overlapped is calculated according to the following calculation formula:

$$\begin{cases} \beta_{xi} = \arccos\left(\dfrac{A_i}{\sqrt{A_i + B_i + C_i}}\right) \\ \beta_{yi} = \arccos\left(\dfrac{B_i}{\sqrt{A_i + B_i + C_i}}\right) \\ \beta_{zi} = \arccos\left(\dfrac{C_i}{\sqrt{A_i + B_i + C_i}}\right) \quad (i = 1, 2, 3); \\ A_i = \sigma_{xyT}\sigma_{yzT} - \sigma_{xzT}(\sigma_{yyT} - \sigma_i) \\ B_i = \sigma_{xzT}\sigma_{xyT} - \sigma_{yzT}(\sigma_{xxT} - \sigma_i) \\ C_i = (\sigma_{yyT} - \sigma_i)(\sigma_{xxT} - \sigma_i) - \sigma_{xyT}^2 \end{cases} \quad (8)$$

in the formula:

$\sigma_{xx}$ is an induced stress produced by the hydraulic fracture in the original maximum horizontal crustal stress direction (parallel to x-axis direction), and the specific stress value at each point is $\sigma_{xx}^i$, MPa;

$\sigma_{yy}$ is an induced stress produced by the hydraulic fracture in the original vertical crustal stress direction (parallel to y-axis direction), and the specific stress value at each point is $\sigma_{yy}^i$, MPa;

$\sigma_{zz}$ is an induced stress produced by the hydraulic fracture in the original minimum horizontal crustal stress direction (parallel to z-axis direction), and the specific stress value at each point is $\sigma_{zz}^i$, MPa;

$\sigma_{xy}$, $\sigma_{xz}$, and $\sigma_{yz}$ are shear induced stresses produced by the hydraulic fracture, and the specific stress value at each point is $\sigma_{xy}^i$, $\sigma_{xz}^i$, $\sigma_{yz}^i$ respectively, MPa;

P is a pore pressure in the stratum after leak-off of fracturing fluid, and the specific stress at each point is $P^i$, MPa;

$\Delta\sigma$ is a pore elastic stress in the stratum after leak-off of fracturing fluid, and the specific stress value at each point is $\Delta\sigma^i$, MPa;

$\sigma_h$ is an original minimum horizontal crustal stress, MPa;

$\sigma_H$ is an original maximum horizontal crustal stress, MPa;

$\sigma_V$ is an original vertical crustal stress, MPa;

$\sigma_i$(i=1, 2, 3) is the magnitude of the three-direction principle effective stress in the reservoir space after the above three stress fields are overlapped with the original crustal stress field, where σ1>σ2>σ3, MPa;

$\beta_{xi}$, $\beta_{yi}$, and $\beta_{zi}$ (i=1, 2, 3) are included angles between respective directions of effective principal stress $\sigma_i$(i=1, 2, 3) in the reservoir space after the above three stress fields are overlapped with the original crustal stress field and the x-axis direction, the y-axis direction and the z-axis direction respectively, 0° to 90°.

All calculations in the present invention are positive with compressive stress and negative with tensile stress.

(5) Calculating an open fracturing determination coefficient M of the natural fracture in the reservoir space and a shear fracturing area determination coefficient S of the natural fracture so as to predict the reservoir reform volume after volume fracturing, and determining the length, width and height of the volume to obtain the magnitude of the reservoir reform volume. The development of natural fractures is a necessary condition for obtaining the ideal volume fracturing reform effect for the low-permeability oil/gas reservoir. Natural fractures are the weak links in the reservoir mechanics. During the reservoir fracturing reform process, natural fractures are more likely to open or fracture by shearing prior to bedrocks, thus forming a complex fracture network body in the three-dimensional reservoir space. Therefore, the total swept volume of these two fracturing ways can be equivalent to the reservoir reform volume. Due to the complex form of reservoir reform volume, in order to facilitate the calculation of the magnitude of the reservoir reform volume, the reservoir reform volume is equivalent to a cuboid in accordance with the conventional calculation thought at the present stage. The magnitude of the reservoir reform volume is calculated by a way of calculating the volume of the cuboid ("length×width×height").

M is an open fracturing determination coefficient of the natural fracture, and M>0 refers that the natural fracture will be opened and fractured in the hydraulic fracturing process, the calculation formula thereof being as follows:

$$\begin{cases} M = -\sigma_n \\ \sigma_n = (\sigma_2\cos^2\theta + \sigma_3\sin^2\theta)\sin^2\varphi + \sigma_1\cos^2\varphi \\ \varphi = \arccos(n_1, nf) \\ \theta = \arctan\left(\dfrac{\cos(n_3, nf)}{\cos(n_2, nf)}\right) \\ \cos(n_i, nf) = \cos\beta_{xi}\sin\alpha\sin\vartheta + \cos\beta_{yi}\cos\alpha + \cos\beta_{zi}\sin\alpha\cos\vartheta \end{cases} \quad (i = 1, 2, 3); \quad (9)$$

S is a shear fracturing area determination coefficient of the natural fracture, and S>0 refers that the natural fracture will be fractured by shearing in the hydraulic fracturing process, the calculation formula being as follows:

$$\begin{cases} S = \tau - k_f \sigma_n - \sigma_o \\ \tau = \sqrt{(\sigma_2^2 \cos^2\theta + \sigma_3^2 \sin^2\theta)\sin^2\varphi + \sigma_1^2 \cos^2\varphi - \sigma_n^2} \end{cases} \quad (10)$$

in the formula:

$\sigma_n$ is a positive stress of the natural fracture wall, MPa;

ψ is an included angle between the normal vector of the natural fracture surface and the maximum effective principal stress $\sigma_1$ after the stress fields are overlapped, 0° to 90°;

θ is an included angle between the normal vector of the natural fracture surface and the minimum effective principal stress $\sigma_3$ after the stress fields are overlapped, 0° to 90°;

α is an included angle between an inclination angle of the natural fracture, i.e., the normal vector of the natural fracture surface and the y-axis, 0° to 90°;

ϑ is an included angle between the natural fracture trend and the original maximum horizontal crustal stress (x-axis direction), 0° to 90°;

τ is a shear stress suffered by the natural fracture surface, MPa;

$K_f$ is a friction coefficient of the natural fracture wall, no dimension;

$\sigma_o$ is a cohesive force of the natural fracture, MPa.

The total swept volume of S>0 and M>0 in the reservoir space is the reservoir reform volume after vertical well volume fracturing, the length, width and height of the volume are determined by observing a top view and a side view of the reservoir reform volume, and the magnitude of the reservoir reform volume is obtained by a way of "length×width×height".

The calculation formulas and parameters involved in the present invention are numerous, and, it will be too burdensome if they are listed one by one. In order to ensure that the present invention is simple and intuitive, only the main calculation formulas and parameters are listed, and corresponding reference documents are listed for the calculation formulas and parameters that are not given.

Compared with the prior art, the present invention has the following beneficial effects: based on the basic theory of elastic mechanics and the three-dimensional displacement discontinuity theory, a complex crustal stress field calculation model taking a three-dimensional hydraulic fracture interference mode into consideration is established, the open fracturing and shear fracturing behaviors of the natural fracture under the complex crustal stress condition are calculated and analyzed, the total swept volume of the above two fracturing modes is equivalent to the reservoir reform volume based on the mechanics formation mechanism of the reservoir reform volume after volume fracturing, and a method for predicting a reservoir reform volume after vertical well volume fracturing of a low-permeability oil/gas reservoir is provided; (2) this method is concise and intuitive, has strong implementability, and is not necessary to obtain micro-seismic monitoring data or yield data after fracturing in advance when the reservoir reform volume is predicted, thereby remedying the deficiencies of the existing calculation methods having higher requirements for basic data.

DETAILED DESCRIPTION OF THE EMBODIMENTS

The present invention is further described below in detail in combination with the drawings and the field application examples.

Taking a tight sandstone reservoir vertical well (Q30) in an oil field in the East of China as an example, the well has a total depth of 2550 m, a reservoir depth of 2442.4-2446.2 m, a thickness of 3.8 m, an average oil layer porosity of 9.2%, and an average permeability of 0.62 mD, and is of a low-porosity, low-permeability reservoir. A technical means of a large-displacement, low-sand-ratio, large-volume, low-viscosity fluid system (based on slickwater) is adopted for this well to perform volume fracturing, such that the reservoir reform volume is maximized and the reservoir utilization ratio is increased, thereby increasing the per-well yield. The natural fracture in the reservoir develops with a larger fracture inclination angle of about 80 degrees, and an included angle with the maximum horizontal crustal stress direction of about 15 degrees. Other basic parameters are shown in Table 1 below.

TABLE 1

| Basic Parameter List of Q30 well | | | |
|---|---|---|---|
| Horizontal maximum crustal stress, MPa | 49 | Horizontal minimum crustal stress, MPa | 38.5 |
| Vertical crustal stress, MPa | 55 | Biot Coefficient | 1 |
| Design height of hydraulic fracture at wellhole, m | 50 | Half length of hydraulic fracture design, m | 150 |
| Poisson's ratio | 0.2 | Original pore pressure of stratum, MPa | 26.8 |
| Young Modulus of stratum rock, GPa | 28 | Cohesive force of natural fracture, MPa | 0 |
| Net pressure of hydraulic fracture, MPa | 5 | Compression coefficient, $10^{-4} MPa^{-1}$ | 2.15 |
| Viscosity of leak-off fracturing fluid (mPa · s) | 1 | Permeability of natural fracture, mD | 150 |
| Friction coefficient of natural fracture wall | 0.6 | Leak-off time, min | 150 |
| Porosity in natural fracture | 0.2 | Height of natural fracture, m | 10 |

Figure 1:
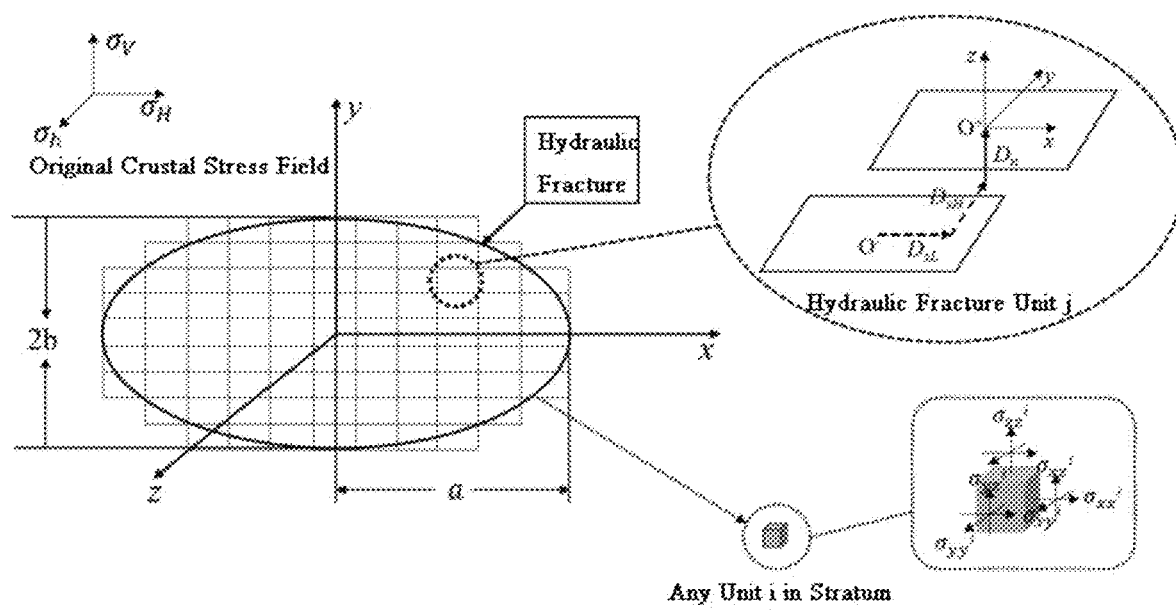
FIG. 1 is a schematic diagram of divisions of units of a hydraulic fracture based on a three-dimensional displacement discontinuity method.

Step 1, calculating an induced stress produced by a hydraulic fracture in a three-dimensional stratum space using the data in Table 1 and Formulas (1) and (2). FIG. 1 shows a specific manner for divisions of units of the hydraulic fracture according to a three-dimensional displacement discontinuity method, as well as a positive induced stress and a tangential induced stress produced by the hydraulic fracture at any point i in the stratum.

Step 2, calculating a stratum pore pressure after leak-off of fracturing fluid using the data in Table 1 and Formula (3) (using Formula (4) in case of a low-permeability gas reservoir).

Step 3, calculating a stratum pore elastic stress after leak-off of fracturing fluid using the data in Table 1 and Formula (5) (the stratum pore elastic stress caused by leak-off of fracturing fluid can be neglected in case of a low-permeability gas reservoir).

Step 4, calculating the magnitude and direction of a spatial three-direction effective principal stress of a new crustal stress field after the above three stress fields are overlapped with the original crustal stress using the data in Table 1 and Formulas (6)-(8) in combination with the calculation results of Steps 1 to 3.

Step 5, predicting a reservoir reform volume of the oil well Q30 after volume fracturing using the data in Table 1 and Formulas (9)-(10) in combination with the calculation result of Step 4, determining the length, width and height of the reservoir reform volume by observing the top view and the side view of the reservoir reform volume, and calculating the magnitude of the reservoir reform volume by a way of "length×width×height".

Figure 2:
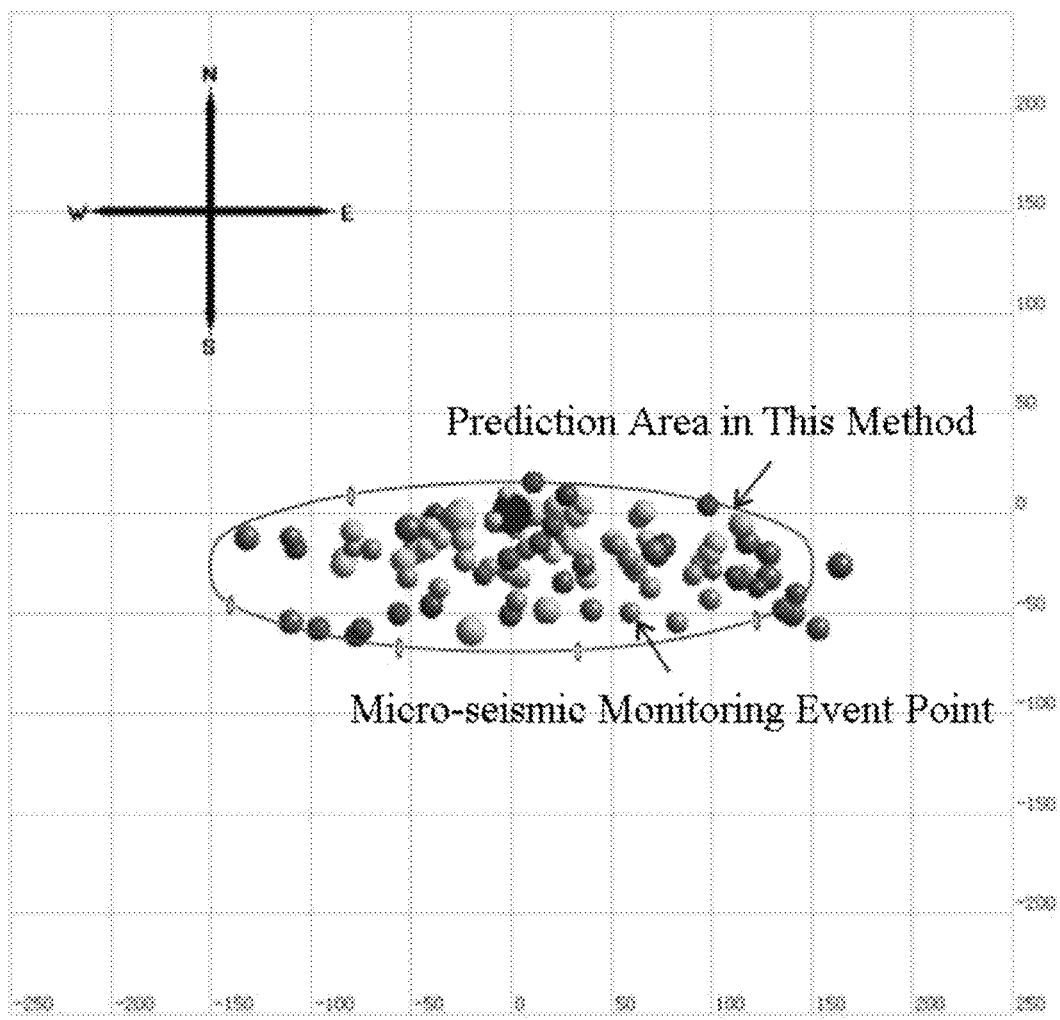
FIG. 2 is a top view of prediction results of the method and a top view of micro-seismic event monitoring results after a Q30 well is fractured.
Figure 3:
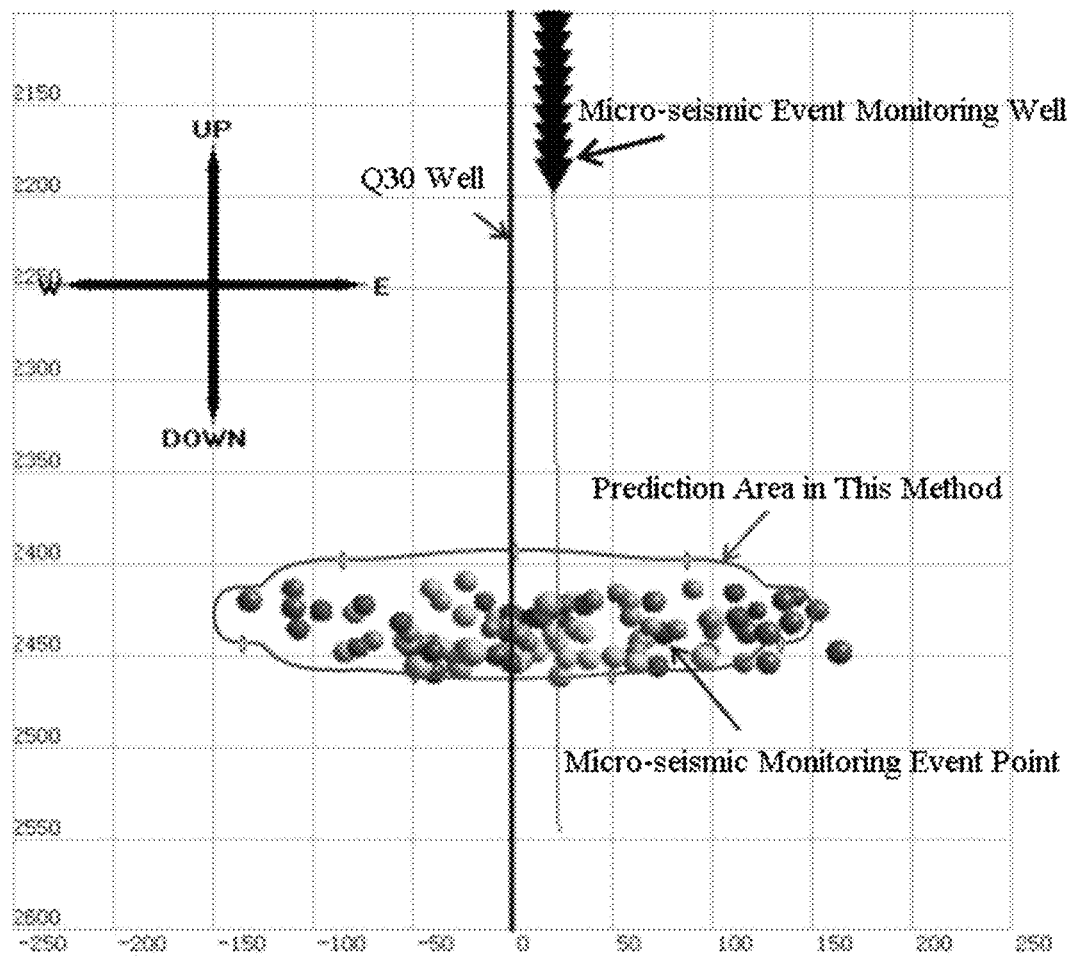
FIG. 3 is a side view of prediction results of the method and a side view of micro-seismic event monitoring results after a Q30 well is fractured.
Figure 4:
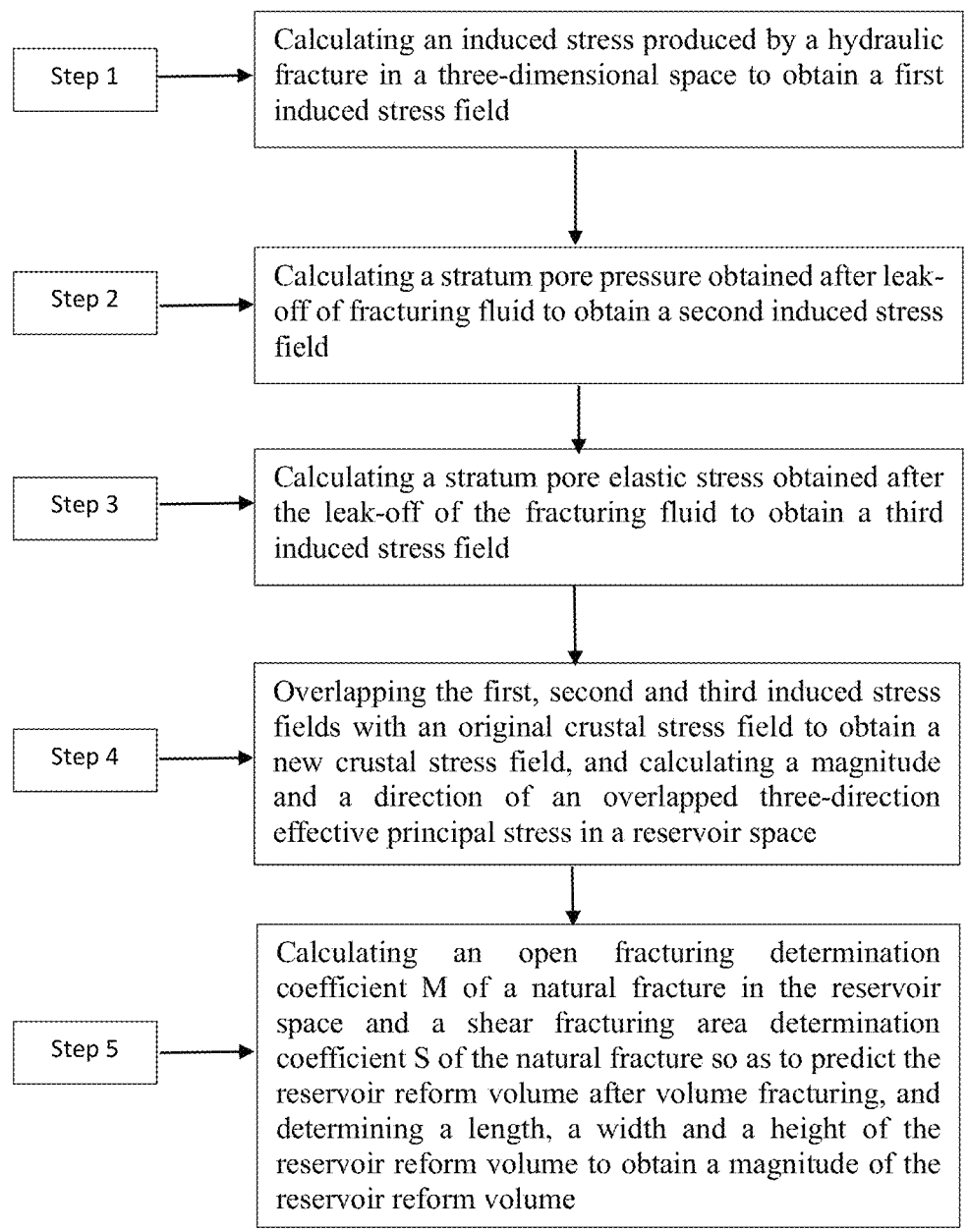
FIG. 4 is a flowchart showing steps of the method for predicting a reservoir reform volume after vertical well volume fracturing of a low-permeability oil/gas reservoir.

As observed from FIG. 2 and FIG. 3, upon calculation in the above steps, it is predicted that the magnitude of the reservoir reform volume of the Q30 well after volume fracturing is approximately $154 \times 10^4$ m$^3$ (length 300 m, width 78 m, height 66 m). After the completion of fracturing of the Q30 well, a micro-seismic monitoring interpretation result shows that a complex fracture network body with a volume reformed as approximately $141 \times 10^4$ m$^3$ (length 300 m, width 76 m, height 62 m) is formed in the reservoir, which is very close to the prediction result of the present invention. At the same time, the top view and the side view of the micro-seismic event monitoring result of the Q30 well after fracturing basically coincides with the top view and the side view of the prediction result of the present method. It is indicated that the method for predicting the reservoir reform volume after vertical well volume fracturing of the low-permeability oil/gas reservoir proposed by the present invention is relatively reasonable, and can provide favorable references for the optimization design of reservoir fracturing construction parameters, the evaluation of effects after fracturing, and the accurate yield prediction after fracturing.

What is claimed is:

1. A method for predicting a reservoir reform volume after vertical well volume fracturing of a low-permeability oil/gas reservoir, sequentially comprising the following steps:
   (1) calculating an induced stress produced by a hydraulic fracture in a three-dimensional space to obtain a first induced stress field;
   (2) calculating a stratum pore pressure obtained after leak-off of fracturing fluid to obtain a second induced stress field;
   (3) calculating a stratum pore elastic stress obtained after the leak-off of the fracturing fluid to obtain a third induced stress field;
   (4) overlapping the first, second and third induced stress fields with an original crustal stress field to obtain a new crustal stress field, and calculating a magnitude and a direction of an overlapped three-direction effective principal stress in a reservoir space;
   (5) calculating an open fracturing determination coefficient M of a natural fracture in the reservoir space and a shear fracturing area determination coefficient S of the natural fracture, wherein the open fracturing determination coefficient M of the natural fracture in the reservoir space and the shear fracturing area determination coefficient S of the natural fracture define at least a length, a width and a height of a reservoir reform volume, from which a magnitude corresponding to the reservoir reform volume after volume fracturing may be obtained; and
   (6) based on the magnitude, maximizing the reservoir reform volume and increasing a utilization ratio such that a per-well yield is increased.

2. The method for predicting the reservoir reform volume after vertical well volume fracturing of the low-permeability oil/gas reservoir according to claim 1, wherein calculating the induced stress produced by the hydraulic fracture in the three-dimensional space in Step (1) refers to establishing a three-dimensional hydraulic fracture induced stress field calculation model based on a three-dimensional displacement discontinuity theory, and calculating a magnitude of an induced stress produced by the hydraulic fracture at a point i in the three-dimensional space according to the following calculation formulas:

$$\begin{cases} \sigma^i_{xx} = \sum_{j=1}^{N} F^{i,j}_{xx,sL} D^j_{sL} + \sum_{j=1}^{N} F^{i,j}_{xx,sH} D^j_{sH} + \sum_{j=1}^{N} F^{i,j}_{xx,nn} D^j_n \\ \sigma^i_{yy} = \sum_{j=1}^{N} F^{i,j}_{yy,sL} D^j_{sL} + \sum_{j=1}^{N} F^{i,j}_{yy,sH} D^j_{sH} + \sum_{j=1}^{N} F^{i,j}_{yy,nn} D^j_n \\ \sigma^i_{zz} = \sum_{j=1}^{N} F^{i,j}_{zz,sL} D^j_{sL} + \sum_{j=1}^{N} F^{i,j}_{zz,sH} D^j_{sH} + \sum_{j=1}^{N} F^{i,j}_{zz,nn} D^j_n \\ \sigma^i_{xy} = \sum_{j=1}^{N} F^{i,j}_{xy,sL} D^j_{sL} + \sum_{j=1}^{N} F^{i,j}_{xy,sH} D^j_{sH} + \sum_{j=1}^{N} F^{i,j}_{xy,nn} D^j_n \\ \sigma^i_{xz} = \sum_{j=1}^{N} F^{i,j}_{xz,sL} D^j_{sL} + \sum_{j=1}^{N} F^{i,j}_{xz,sH} D^j_{sH} + \sum_{j=1}^{N} F^{i,j}_{xz,nn} D^j_n \\ \sigma^i_{yz} = \sum_{j=1}^{N} F^{i,j}_{yz,sL} D^j_{sL} + \sum_{j=1}^{N} F^{i,j}_{yz,sH} D^j_{sH} + \sum_{j=1}^{N} F^{i,j}_{yz,nn} D^j_n \end{cases}$$

$$\begin{cases} \sigma^j_{zz} = p^j_{net} \\ \sigma^j_{xz} = 0 \quad (j = 1, 2, 3, \ldots, N); \\ \sigma^j_{yz} = 0 \end{cases}$$

in the formulas, $\sigma^i_{xx}$, $\sigma^i_{yy}$, and $\sigma^i_{zz}$ are positive induced stresses and $\sigma^i_{xy}$, $\sigma^i_{xz}$, and $\sigma^i_{yz}$ are shear induced stresses produced by the hydraulic fracture at the point i in the three-dimensional space respectively, measured in MPa;

$F^{i,j}_{xx,sL}$, $F^{i,j}_{xx,sH}$, $F^{i,j}_{xx,nn}$, $F^{i,j}_{yy,sL}$, $F^{i,j}_{yy,sH}$, $F^{i,j}_{yy,nn}$, $F^{i,j}_{zz,sL}$, $F^{i,j}_{zz,sH}$, $F^{i,j}_{zz,nn}$, $F^{i,j}_{xy,sL}$, $F^{i,j}_{xy,sH}$, $F^{i,j}_{xy,nn}$, $F^{i,j}_{xz,sL}$, $F^{i,j}_{xz,sH}$, $F^{i,j}_{xz,nn}$, $F^{i,j}_{yz,sL}$, $F^{i,j}_{yz,sH}$ and $F^{i,j}_{yz,nn}$ and are boundary influence coefficients respectively;

N is a total number of units divided by the hydraulic fracture;

$D^j_{sL}$, $D^j_{sH}$ are discontinuity quantities of tangential displacements on hydraulic fracture unit j, and $D^j_n$ is discontinuity quantities of normal displacements on hydraulic fracture unit j respectively;

$\sigma^i_{zz}$ is a positive stress boundary value in an original minimum crustal stress direction (parallel to a z-axis) on the hydraulic fracture unit j, measured in MPa;

$\sigma^i_{xz}$ and $\sigma^i_{yz}$ are boundary values of shear stresses on the hydraulic fracture unit j respectively, measured in MPa;

$p^j_{net}$ is a net pressure on the hydraulic fracture unit j, measured in MPa.

3. The method for predicting the reservoir reform volume after vertical well volume fracturing of the low-permeability oil/gas reservoir according to claim 1, wherein in Step (2), the stratum pore pressure is calculated after the leak-off of the fracturing fluid according to the specific calculation formulas:

for the low-permeability oil reservoir:

$$\begin{cases} P^i = P_0 + (P_f - P_0)e^{-\xi\lambda\left(1+\sqrt{\mu+b^2}\right)} \\ \xi = \left(\frac{g\pi}{2}\right)^2 \\ g = \sqrt{\frac{\phi\mu_l c}{kt}} \end{cases}$$

for the low-permeability gas reservoir:

$$P^i = P_o + (P_f - P_o)\frac{\eta}{\eta_L}$$

$$\eta_L = \sqrt{\frac{2k(P_f - P_o)t}{\mu_l \phi L^2}}$$

$$\eta = \operatorname{arsinh}\left(\sqrt{\frac{x_i^2 + y_i^2 - L^2 + \sqrt{(L^2 - x_i^2 - y_i^2)^2 + 4L^2 y_i^2}}{2L^2}}\right);$$

in the formulas:

$P^i$ is a pore pressure at any point i in a stratum after the leak-off of the fracturing fluid, measured in MPa;

$P_0$ is an original pore pressure of the stratum, measured in MPa;

$P_f$ is a fluid pressure in the hydraulic fracture, measured in MPa;

$\lambda$, $\mu$ is a coordinate value of any point i in a three-dimensional hydraulic fracture ellipsoidal coordinate system, measured in m²;

b is a half fracture height of the hydraulic fracture at a wellbore, measured in m;

φ is porosity of the natural fracture, no dimension;

$\mu_1$ is viscosity of the fracturing fluid, measured in MPa·s;

c is a compression factor of the natural fracture, measured in MPa⁻¹;

k is permeability of the reservoir, measured in D;

t is leak-off time, measured in s;

L is a length of the hydraulic fracture, measured in m;

$x_i$ is a coordinate value of any point i in a three-dimensional rectangular coordinate system along a fracture length direction (an x-axis direction), measured in m;

$y_i$ is a coordinate value of any point i in the three-dimensional rectangular coordinate system along a fracture height direction (a y-axis direction), measured in m.

4. The method for predicting the reservoir reform volume after vertical well volume fracturing of the low-permeability oil/gas reservoir according to claim 1, wherein in Step (3), the stratum pore elastic stress after the leak-off of the fracturing fluid is calculated according to the following calculation formulas:

$$\begin{cases} \Delta\sigma^i = \frac{A(P^i - P_o)}{2+\varsigma} \\ A = \alpha\frac{1-2v}{1-v} \\ \varsigma = \frac{\gamma h\sqrt{\pi} + \sqrt{\gamma^2 h^2 \pi + 4}}{2} \\ \gamma = \sqrt{\frac{10^3 \times \phi\mu c}{4kt}} \end{cases};$$

in the formulas:

$\Delta\sigma^i$ is a pore elastic stress produced by a change in the stratum pore pressure at any point i, measured in MPa;

A is a pore elastic constant, no dimension;

v is a Poisson's ratio of stratum rock, no dimension;

ζ is a parameter for describing a dimension and a shape of fluid intrusion, no dimension;

α is a Biot coefficient, no dimension;

h is a half fracture height of the natural fracture, measured in m.

5. The method for predicting the reservoir reform volume after vertical well volume fracturing of the low-permeability oil/gas reservoir according to claim 1, wherein in Step (4), the magnitude and the direction of the three-direction effective principal stress in the reservoir space after the first, second and third induced stress fields are overlapped are calculated according to the following processes:

first, the first, second and third induced stress fields are overlapped with the original crustal stress field according to the following formulas:

$$\begin{cases} \sigma_{xxT} = \sigma_{xx} + \sigma_H + \alpha P + \Delta\sigma \\ \sigma_{yyT} = \sigma_{yy} + \sigma_V + \alpha P + \Delta\sigma \\ \sigma_{zzT} = \sigma_{zz} + \sigma_h + \alpha P + \Delta\sigma \\ \sigma_{xyT} = \sigma_{xy} \\ \sigma_{xzT} = \sigma_{xz} \\ \sigma_{yzT} = \sigma_{yz} \end{cases};$$

said formulas are substituted into the following formula solved to obtain the magnitude of the three-direction effective principal stress in the reservoir space after the first, second and third induced stress fields are overlapped:

$$\sigma_i^3 - (\sigma_{xxT} + \sigma_{yyT} + \sigma_{zzT})\sigma_i^2 + (\sigma_{xxT}\sigma_{yyT} + \sigma_{xxT}\sigma_{zzT} + \sigma_{yyT}\sigma_{zzT} - \sigma_{xyT}^2 - \sigma_{xzT}^2 - \sigma_{yzT}^2)\sigma_i - (\sigma_{xxT}\sigma_{yyT}\sigma_{zzT} - \sigma_{xxT}\sigma_{yzT}^2 - \sigma_{yyT}\sigma_{xzT}^2 - \sigma_{zzT}\sigma_{xyT}^2 + 2\sigma_{xyT}\sigma_{xzT}\sigma_{yzT}) = 0 (i=1,2,3);$$

then, the direction of the three-direction effective principal stress in the reservoir space after the first, second and third induced stress fields are overlapped is calculated according to the following calculation formulas:

$$\begin{cases} \beta_{xi} = \arccos\left(\frac{A_i}{\sqrt{A_i + B_i + C_i}}\right) \\ \beta_{yi} = \arccos\left(\frac{B_i}{\sqrt{A_i + B_i + C_i}}\right) \\ \beta_{zi} = \arccos\left(\frac{C_i}{\sqrt{A_i + B_i + C_i}}\right) \quad (i=1,2,3); \\ A_i = \sigma_{xyT}\sigma_{yzT} - \sigma_{xzT}(\sigma_{yyT} - \sigma_i) \\ B_i = \sigma_{xzT}\sigma_{xyT} - \sigma_{yzT}(\sigma_{xxT} - \sigma_i) \\ C_i = (\sigma_{yyT} - \sigma_i)(\sigma_{xxT} - \sigma_i) - \sigma_{xyT}^2 \end{cases}$$

in the formulas:

$\sigma_{xx}$ is an induced stress produced by the hydraulic fracture in an original maximum horizontal crustal stress direction (parallel to an x-axis direction), and a specific first stress value at each point i is $\sigma_{xx}^i$, measured in MPa;

$\sigma_{yy}$ is an induced stress produced by the hydraulic fracture in an original vertical crustal stress direction (parallel to a y-axis direction), and a specific second stress value at each point i is $\sigma_{yy}^i$, measured in MPa;

$\sigma_{zz}$ is an induced stress produced by the hydraulic fracture in an original minimum horizontal crustal stress direction (parallel to a z-axis direction), and a specific third stress value at each point i is $\sigma_{zz}^i$, measured in MPa;

$\sigma_{xy}$, $\sigma_{xz}$, and $\sigma_{yz}$ are shear induced stresses produced by the hydraulic fracture, and a specific forth stress value at each point i is $\sigma_{xy}^i$, $\sigma_{xz}^i$, $\sigma_{yz}^i$ respectively, measured in MPa;

P is a pore pressure in the stratum after leak-off of fracturing fluid, and a specific fifth stress at each point i is $P^i$, measured in MPa;

$\Delta\sigma$ is a pore elastic stress in the stratum after leak-off of fracturing fluid, and a specific sixth stress value at each point i is $\Delta\sigma^i$, measured in MPa;

$\sigma_h$ is an original minimum horizontal crustal stress, measured in MPa;

$\sigma_H$ is an original maximum horizontal crustal stress, measured in MPa;

$\sigma_V$ is an original vertical crustal stress, measured in MPa;

$\sigma_i$ (i=1, 2, 3) is the magnitude of the three-direction principle effective stress in the reservoir space after the first, second and third induced stress fields are overlapped with the original crustal stress field, where $\sigma1 > \sigma2 > \sigma3$, measured in MPa;

$\beta_{xi}$, $\beta_{yi}$, and $\beta_{zi}$ (i=1, 2, 3) are included angles between respective directions of effective principal stress $\sigma_i$ (i=1, 2, 3) in the reservoir space after the first, second and third induced stress fields are overlapped with the original crustal stress field and the x-axis direction, the y-axis direction and the z-axis direction respectively, ranging from 0° to 90°.

6. The method for predicting the reservoir reform volume after vertical well volume fracturing of the low-permeability oil/gas reservoir according to claim 1, wherein in Step (5), the open fracturing determination coefficient M of the natural fracture in the reservoir space and the shear fracturing area determination coefficient S of the natural fracture are calculated so as to predict the reservoir reform volume after the volume fracturing, according to the following formulas:

$$\begin{cases} M = -\sigma_n \\ \sigma_n = (\sigma_2 \cos^2\theta + \sigma_3 \sin^2\theta)\sin^2\varphi + \sigma_1 \cos^2\varphi \\ \varphi = \arccos(n_1, nf) \\ \theta = \arctan\left(\dfrac{\cos(n_3, nf)}{\cos(n_2, nf)}\right) \\ \cos(n_i, nf) = \cos\beta_{xi}\sin\alpha\sin\vartheta + \cos\beta_{yi}\cos\alpha + \cos\beta_{zi}\sin\alpha\cos\vartheta \end{cases} \quad (i=1,2,3)$$

$$\begin{cases} S = \tau - k_f \sigma_n - \sigma_o \\ \tau = \sqrt{(\sigma_2^2 \cos^2\theta + \sigma_3^2 \sin^2\theta)\sin^2\varphi + \sigma_1^2 \cos^2\varphi - \sigma_n^2} \end{cases} ;$$

in the formulas:

$\sigma_n$ is a positive stress of a natural fracture wall, measured in MPa;

$\varphi$ is an included angle between a normal vector of a natural fracture surface and a maximum effective principal stress $\sigma_1$ after the stress fields are overlapped, ranging from 0° to 90°;

$\theta$ is an included angle between the normal vector of the natural fracture surface and a minimum effective principal stress $\sigma_3$ after the stress fields are overlapped, ranging from 0° to 90°;

$\alpha$ is an included angle between an inclination angle of the natural fracture, which is, between the normal vector of the natural fracture surface and a y-axis, ranging from 0° to 90°;

$\vartheta$ is an included angle between a natural fracture trend and an original maximum horizontal crustal stress (an x-axis direction), ranging from 0° to 90°;

$\tau$ is a shear stress suffered by the natural fracture surface, measured in MPa;

$K_f$ is a friction coefficient of the natural fracture wall, no dimension;

$\sigma_o$ is a cohesive force of the natural fracture, measured in MPa;

a total swept volume of S>0 and M>0 in the reservoir space is the reservoir reform volume after vertical well volume fracturing.

\* \* \* \* \*